Nov. 17, 1970    J. J. KNOX    3,540,112
METHOD FOR MANUFACTURING A HYPODERMIC NEEDLE
Filed Jan. 18, 1967    5 Sheets-Sheet 1

INVENTOR.
JAMES J. KNOX
BY
Kenyon & Kenyon
ATTORNEYS

Nov. 17, 1970 J. J. KNOX 3,540,112
METHOD FOR MANUFACTURING A HYPODERMIC NEEDLE
Filed Jan. 18, 1967 5 Sheets-Sheet 2

INVENTOR
JAMES J. KNOX
BY Kenyon & Kenyon
ATTORNEYS

INVENTOR.
JAMES J. KNOX
BY
ATTORNEYS

Nov. 17, 1970   J. J. KNOX   3,540,112
METHOD FOR MANUFACTURING A HYPODERMIC NEEDLE
Filed Jan. 18, 1967   5 Sheets-Sheet 5

INVENTOR.
JAMES J. KNOX
BY Kenyon & Kenyon
ATTORNEYS

United States Patent Office 3,540,112
Patented Nov. 17, 1970

1

3,540,112
METHOD FOR MANUFACTURING A HYPODERMIC NEEDLE
James J. Knox, Avenel, N.J., assignor to Knox Laboratories, Inc., Rahway, N.J., a corporation of New Jersey
Filed Jan. 18, 1967, Ser. No. 610,152
Int. Cl. B23p 17/00
U.S. Cl. 29—414    20 Claims

ABSTRACT OF THE DISCLOSURE

Hypodermic needle points are manufactured from tubular members by deforming top and bottom wall portions from opposite sides of the tubular member by gradually and progressively pressing generally inwardly against the top and bottom wall portions with dies so as to cause the top and bottom wall portions to gradually slope together and meet in an area where they intimately contact each other, and removing some of the opposite side wall portions to create side surfaces which slope together from the unsloped portion of the tubular member to where they intersect in a cutting point or edge in the area where the top and bottom wall portions are in intimate contact.

---

This invention relates to the manufacture of hypodermic needles, and more particularly to a method of manufacturing a hypodermic needle point which may be practiced on a mass production scale at low cost, according to which a needle point is formed by progressively collapsing opposite sides, e.g. the top and bottom, of needle tubing and then removing material from the sides so that at the end of the needle, top, bottom, and side planes incline to form a point, with side openings into the bore of the hollow tubing for the passage of fluids. The invention also relates ot an improved needle.

The hypodermic needle which is today in general use throughout the country by hospitals, clinics, and private medical doctors is known to have serious disadvantages and even defects. Nevertheless, it remains in widespread use because the various constructions which have been suggested to eliminate the problems have either failed or had serious disadvantages of their own or, what is perhaps more important, the few past suggestions which have held out some theoretical promise of solving the past problems have simply not been practical—no one has been able to devise a method for their manufacture on a large or economical scale so as to make feasible their general use. It is to the practical problem of providing a method for mass producing an improved needle, a problem which has cost untold numbers of patients pain and suffering and occasionally more serious problems, that the present inventor has turned his attention and to which he offers a solution.

There are many situations in which it is preferred to use a needle only once and then discard it to prevent any risk of cross-infection, and the problem of providing a suitable economical needle for this market is particularly difficult.

The conventional needle—not the theoretical best known needle (some of which are discussed hereinafter), but best practical needle design and thus the one in general use—and also the improvements achieved by the present invention are described with reference to the following figures in which:

FIGS. 1–3 show a conventional needle in top, side and end sectional views respectively.

FIG. 4 illustrates the veering which may be experienced by needles with conventional points, and FIG. 5 diagrammatically shows the forces which cause veering.

FIG. 6 shows a tube for manufacture into a syringe needle according to the present invention.

FIG. 16 shows a side view of the needle point after side and top grinding.

FIG. 17 shows an end section through the point of FIG. 16.

FIG. 20 is an end sectional view taken on line 20—20 of FIG. 19.

FIG. 21 is a side partial sectional view depicting the improved needle being inserted in flesh.

Figure 1:
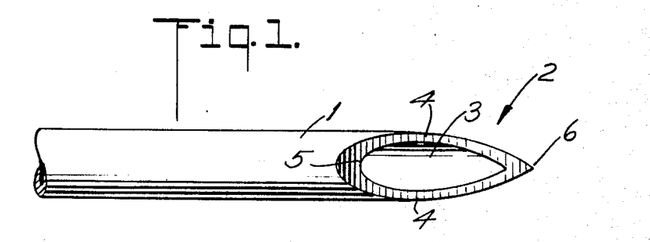
Figures 2, 3, 4, 5, 16, 17, 20, 21:
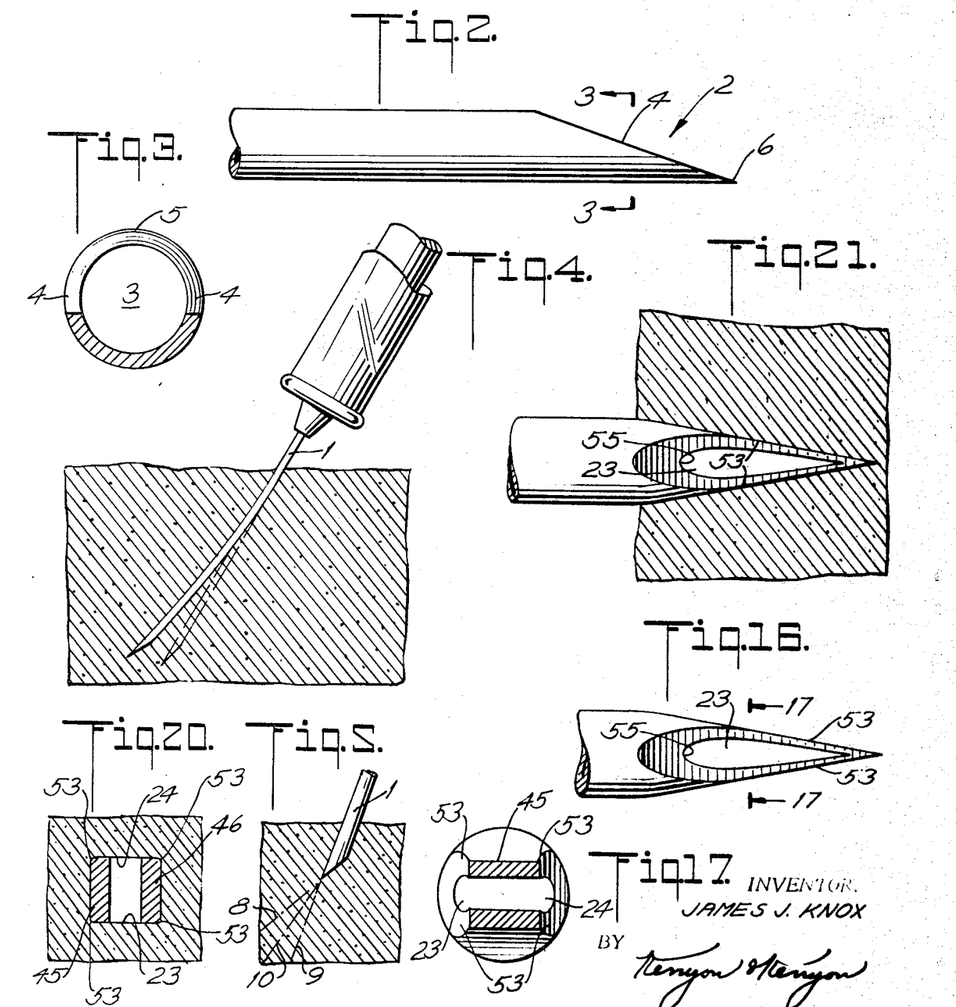

Conventional needles are formed by taking a hollow tube 1 and cutting or grinding one end at an angle oblique to the longitudinal axis of the tube as shown in FIGS. 1 and 2. The point 2 thus formed may then be finished by grinding and polishing. This results in an elliptical opening in the plane of the cut as shown at 3, and a circular opening as viewed and or as shown in FIG. 3. It is through this opening that the fluid passes into the body.

The needle formed in this way can be manufactured in quantity but it has many defects. Some of the more important defects may be designated coring, tearing, veering, and dispersion, which are discussed below. The overall problem, of course, is to eliminate or minimize all these problems with a needle that can be manufactured in quantity at reasonable cost.

CORING

Figures 12, 22, 23:
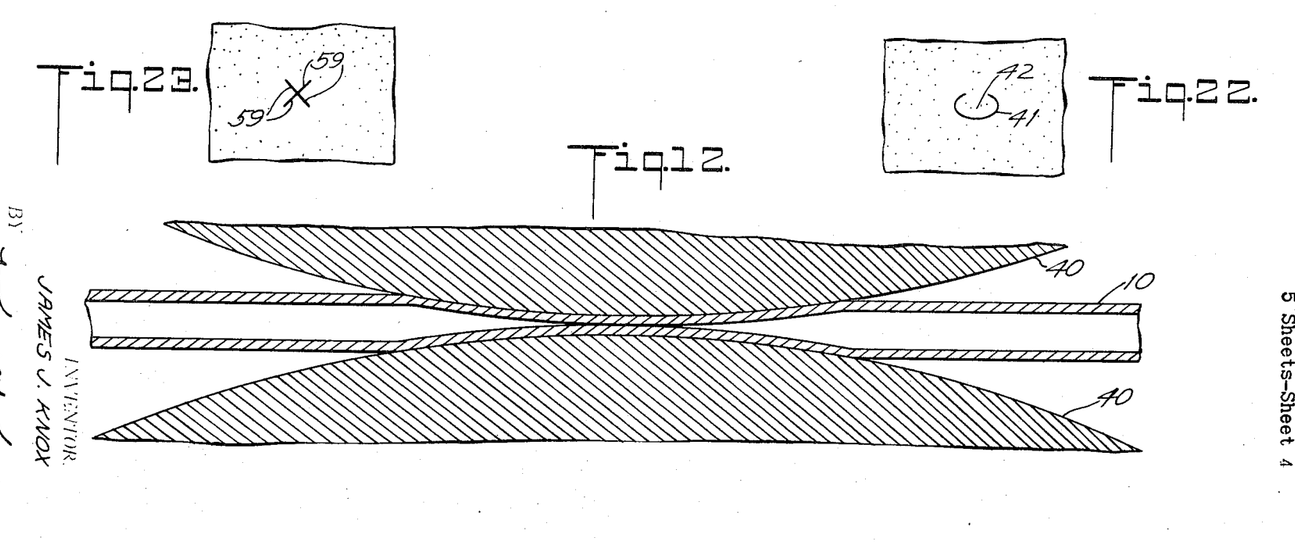
FIG. 22 shows the "cut" made by a conventional needle passed vertically into skin and flesh with the core not completely cut off.
FIG. 23 shows the cut made by the improved needle of the present invention.

First, the conventional needle tends to "core." That is, when the tubular needle is pushed endwise through human flesh, see the end partial sectional view 3, the edges 4, 5 of the tube 1 tend to cut out a core of flesh and this is particularly true of the following edge of heel 5 of the opening 3 of the needle point, which heel will catch, scrape, and tear the skin in its path. An example of coring is shown in FIG. 22, with the cut 41 stopped before the core 42 is completely cut. It should be understood that coring is not inevitable, and that depending on the variables of insertion, e.g. the condition of the flesh, speed and angle of insertion, sharpness of the heel of the needle, and the exact shape of its opening, the core may not be completely cut but may instead be stretched nad torn about the needle heel. The skin and flesh are either cored, on the one hand, or pulled and torn on the other, for if the cutting edge of the conventional needle is completely sharpened to cut all around so as to permit the full needle diameter to pass without stretching and tearing, then a core is cut, and if the heel of the edge is left dull, then there is tearing. It should be further understood that coring is not only painful, but dangerous since the core may inadvertently be injected into the vein along with the medication.

The coring problem is also present when the tubular needle is pushed endwise through the soft sealing stopper of a bottle of medicine in order to fill the syringe to which the needle is attached. Because of coring or the scraping of the heel edge of the needle, a portion of the rubber or synthetic stopper is sometimes cut off and may fall into the bottle thus contaminating the rest of the contents or, perhaps even worse, may be withdrawn up through the needle and into the syringe where, if it is unnoticed, it will then be injected into the patient, along with the medicine.

Considerable effort has been expended to devise methods of grinding of surfaces on the conventional syringe needle that will alleviate the coring problem, see for example, the patent to G. W. Jacoby, Jr. 2,711,733. The difficulty with grinding surfaces such as taught by Jacoby is that first, while it may somewhat alleviate the coring (and tearing) problem as compared to the use of a needle without such grinding surfaces, it does not change the basic wide spread cutting surfaces surrounding the opening of the tubular needle which are primarily responsible for the problem. Second, the grinding procedure is relatively complicated, the needle being rotated during the grinding and it being a requirement that the needle be accurately positioned if the ground surfaces are to be properly located. While such grinding is possible in manufacture, it is not always done precisely as will be appreciated when it is understood that the surfaces being ground on the end of the syringe needle are very small and, for the common sizes, bearly visible to the naked eye. Moreover, it is virtually impossible for such needles as are reused to be resharpened with the facilities and personnel available in doctors' offices and the typical hospital. This results in the use of dull needles with considerable tearing of flesh, and pain.

R. L. Huber U.S. Pat. No. 2,409,979 attempted to solve the problem by taking a conventional oblique-faced needle and bending it at the point where the open face ended so that the opening would lie on a plane parallel to the longitudinal axis of the tube even with the body of the tube. Thus there would be no exposed heel for the skin to catch on and thus no coring. Advantages of the construction are described in column 3, lines 34–58. But the bending of the point made the directional qualities of the needle poorer than a conventional needle. The inventor himself recognized this and in R. L. Huber U.S. Pat. Nos. 2,717,599 and 2,717,600 admitted the problem, see especially column 1, and tried to remedy it by providing for a lesser bending of the tip. But the resultant improvement in directional qualities from this change resulted in an increase in coring and necessitated the extra manufacturing step of rounding the top edge 18 of the recess to lessen the coring. The end result was a poor compromise between directional qualities and coring with increased difficulty and cost of manufacture.

An extreme solution has been an attempt to remove the opening completely during penetration and thus eliminate coring. This is taught by J. C. Bamford, Jr., et al., U.S. Pat. No. 2,623,520. Bamford in column 1, lines 13–19, refers to the practice of eliminating coring by placing a solid rod through the bore of a conventional needle, and grinding the end of the rod so it just fills and is flush with the opening of the bore of the needle as it opens at the point. This rod or stylet is placed in the needle and it and the needle are inserted together. When the needle is in place, the stylet is removed and the injection may take place. As a practical matter the ordinarily used needles are too small to be conveniently fitted with stylets and, even with larger sizes, the stylet procedure is obviously cumbersome, the stylet having to be removed and the syringe then connected to the needle while it is in the flesh. Bamford achieved a centrally disposed point only by having a centrally disposed stylet with a point thereon and, among other disadvantages, this procedure keeps and requires the bothersome stylet procedure and, in addition, the lack of any cutting surfaces along the needle results in the tearing of the flesh when it is inserted.

Various complex needle constructions have also been suggested to solve the problem, see for example, D. A. Hamilton 2,989,053, C. B. Dolge 648,858, and R. D. Hanson 2,634,726. These constructions, however, pose sufficiently difficult and expensive problems in manufacture that they are not practical for general hypodermic syringe needle use and, in addition, are not as desirable as the needle taught herein.

TEARING

The conventional syringe needle also tends to tear the flesh upon insertion rather than cutting it evenly which would be desirable since a clean cutting point renders the syringe needle easier to insert and thus easier to control, it causes less pain to the patient, and causes a minimum of bruising and damage to the flesh so that the wound heals faster.

The conventional needle point tears partly because of the wide spaced edges whose surfaces must be shaped primarily in a effort to reduce coring and only secondarily shaped to cut. Conventional needles also tear because the edges are formed by grinding curved surfaces on the very small point, and it is difficult to hold to the precise standards which are desirable in mass production, and almost impossible for such surfaces to be sharpened under field conditions.

Parenthetically, work has been undertaken to devise a needle point which can be more easily ground and sharpened and which has sufficient inherent sharpness to the cutting edge so that even if the edges should be slightly dulled, the overall shape of the surface adjacent the edge would tend to cut rather than tear the flesh, see B. E. Baldwin et al., 3,090,384. Such needles as have been suggested, however, even though their cross-sections are triangular rather than elliptical, are still formed by an oblique cut leaving the standard oblique face exposed with its inherent coring, directional and dispersion problems.

It should further be understood that in the conventional syringe needle point, there are only two cutting edges, and that it is difficult to grind these for their full length without unduly weakening the needle point and/or contributing to a sharp heel surface that would increase coring. In fact, it is a frequent practice to grind and sharpen only about the first half of the conventional needle point, i.e. beginning at the point and extending back but not past the area where the opening begins to close inward again, although the diameter and cross-sectional of the needle itself are not yet full size at this location and upon insertion the needle is still expanding in its passage through skin and flesh and although cutting relief would obviously help. But as already mentioned, this cutting relief can simply not be feasibly provided for needles of conventional design.

VEERING

A third problem is to insure that the needle hits the desired target within the body. The face of the conventional needle point of FIG. 1 is an oblique plane which culminates in a tip 6 located at the side of the needle tube 1 rather than in the center. As the tip is pushed through flesh, the needle tends to follow a path parallel to the oblique surface rather than in the direction at which it started its entry. In other words, the surfaces about the opening at the point are like inclined planes and these planes deflect the needles, especially relatively long and slender needles, as they are shoved through the flesh and muscle. The deflection is generally illustrated in FIG. 4 described hereinafter, with the dotted line showing the position of the needle as it appears to the physician and the solid line showing the actual position of the needle in the flesh. FIG. 5 shows in detail the approximate deflection for flexible needles in firm flesh. The line 8 represents the plane of the oblique surface of the point which surrounds the opening of the tubular needle 1. The line 9 indicates the plan of the tubular needle itself, and the apparent direction of the needle to a physician guiding its insertion. The line 10 indicates the approximate path which the needle point will tend to follow except as it is restrained by the rigidity of the needle body. The veering experienced by longer needles causes pain and tissue damage as the flesh is caused to bend the needle. It may also cause the point of the needle to miss the spot to which the physician wishes to apply medication, as for example, when the longer needles are caused to administer cortisone to arthritic patients. Even where the mislocation of the point is detected by the skilled physician, he must retract the needle and reinsert it with the consequent further tissue damage of a second or even third try. If the mislocation of the needle point is not detected, the medication is consequently misdirected.

Attempts to improve the directional properties of a needle by eliminating the oblique plane has resulted in points of complex construction and of other difficulties, see for example, R. L. Huber Nos. 2,717,599 and 2,717,600, J. C. Bamford, Jr. et al. 2,623,520, and D.A. Hamilton 2,989,053.

Recent work has suggested that the conventional point may be used without excessive veering if specially shaped tubing or hollow channel member is used to forcibly restrain the needle from bending. For example, S. J. Everett 2,830,587, teaches in FIGS. 12 and 13 the use of an elliptical tube for the needle and it is explained in column 1, lines 64–71 that the shaft is more resistant to bending in plane of the tip than in the plane containing the minor axis.

DISPERSION

A further difficulty with the conventional syringe needle is that the medication may be injected through only one opening and thus in only one direction. Moreover, the single opening may be partially obstructed, as if it should be happenstance lie adjacent a vein wall. In many applications, the medication should be injected through two or more openings on at least two sides of the needle, either to provide a broader area for the diffusion of the medication into the vein, muscle, etc. or to maximize the chance that at least one side will be free of any obstructions, and in both cases to thereby reduce the back pressure and pain. Past attempts to provide such openings have been either complex or otherwise impractical. For example, T. H. Gewecke No. 2,862,495 attempted to reduce the extra manufacturing operations usually associated with additional openings by using a swaging process. However this necessitates use of a softer metal with resultant loss of strength and sharpness attainable, and his needle further lacks any cutting edges.

THE PRESENT INVENTION

It is the object of the present invention to provide a method of making a needle which virtually eliminates coring, tearing, poor direction and poor dispersion and yet, by the present method, is inexpensive and easy to manufacture.

These objects and advantages appear from the above discussion and drawings, and from the following description.

According to the present invention needles are manufactured from conventional tubular stock 10 such as is illustrated in FIG. 6; for example, full hard stainless type 304 austenitic chromium-nickel stainless steel tubing, or almost full hard tubing, that is, tubing cold worked a little less than typical for full hard syringe needle tubing. It should be understood that it would be possible to use fully annealed tubing, and indeed the forming of the needle point would be rendered easier thereby. But by the present invention it is possible to use even full hard tubing and this is preferable for rigidity and strength, for retaining the sharpness of the ground point, and to facilitate the initial grinding of the point with a minimum burr.

The first step is to shape the stock 1 as shown generally in FIGS. 7–10.

The shaping of full hard syringe tubing should be performed with care lest the tubing crack. It has been found that the particular orientation of the tubing about its longitudinal axis with respect to the dies may have an effect on the likelihood of cracking, and this is now thought to be because when a hardened syringe tubing is formed of flat sheet, there is a seam formed. In subsequent operations and drawing this seam becomes invisible to the unaided eye, but its varying orientation with respect to forming dies used as taught herein causes a varying tolerance to cracking. Since it is not convenient to detect and control the orientation of the "seam," the forming taught herein is designed to work the tubing without cracking regardless of its orientation.

Figure 7:
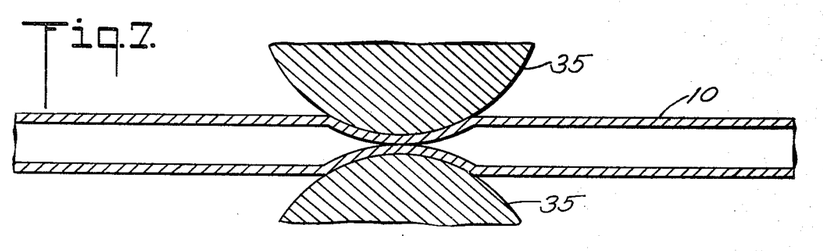
FIGS. 7–12 show side sectional views of the progressive forming according to the present invention.
Figure 8:
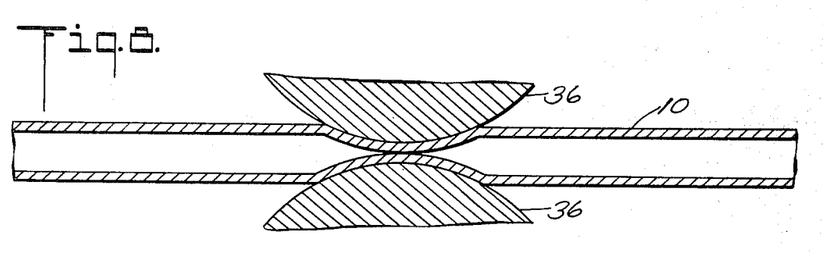
Figure 9:
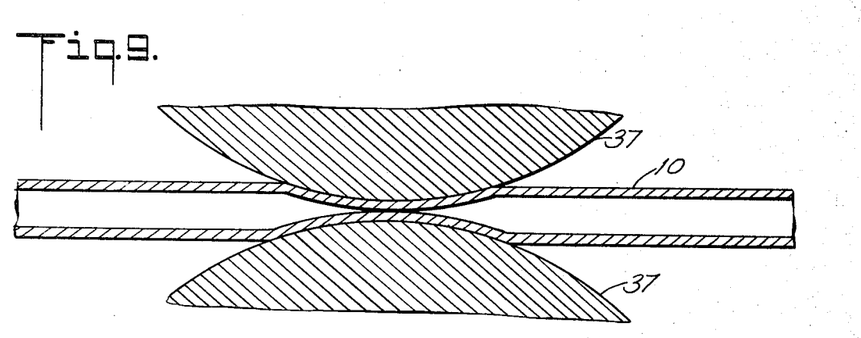
Figure 10:
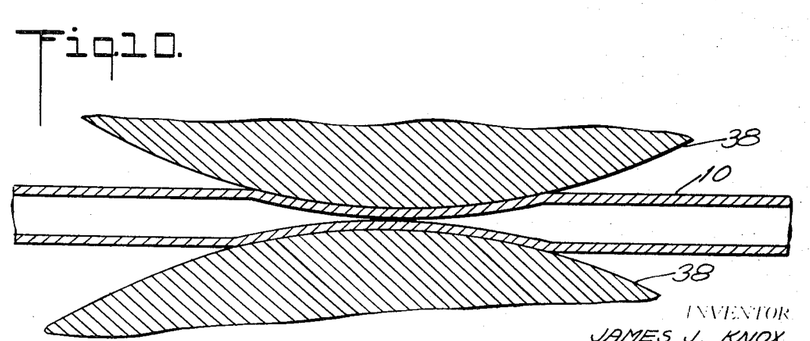
Figure 11:
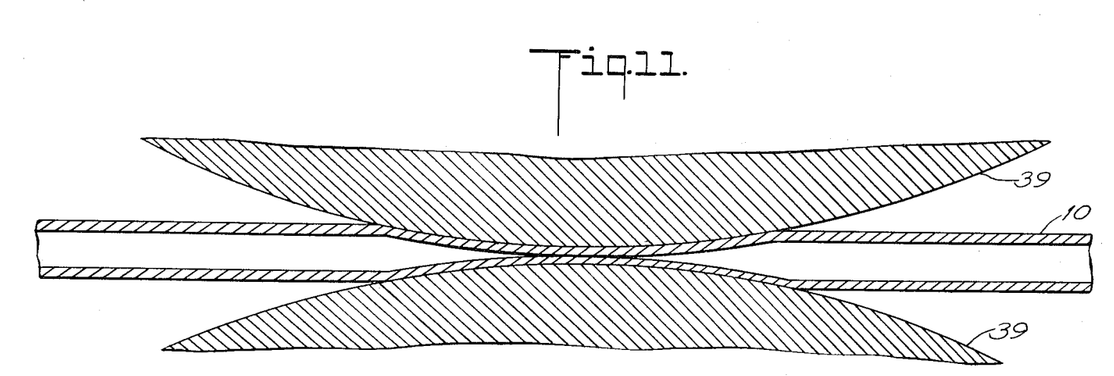

The presently preferred procedure is to first collapse or deform the tubing 10 with two hard round dies 35 of about ¼ inch in diameter aligned opposite to one another on opposite sides of the tubing as shown in FIG. 7; to then further collapse the tubing 10 with two dies 36 of about 5/16 inch in diameter as shown in FIG. 8; to then further collapse the tubing 10 with two dies 37 of about ⅝ inch in diameter as shown in FIG. 9; to then further collapse the tubing 10 with two dies 38 of about 1⅛ inches in diameter as shown in FIG. 10; to then further collapse the tubing 10 with two dies 39 of about 1¾ inches in diameter as shown in FIG. 11, and to then further collapse the tubing 10 with two dies 40 of about 2¼ inches in diameter as shown in FIG. 12. It is to be understood that as used herein, the terms "collapse" or "deforming" shall both be intended to mean to alter the shape of a material by applying a stress thereon.

Alternatively, the tubing may be shaped by vibrating dies to flow the material into the collapsed shape, and this may be by small dies reciprocated over and under the tubing to gradually shape it or even the final dies, while vibrating, could be gradually closed upon the tubing. See column 6 infra.

This shaping may be made in the center of a piece of stock long enough so that two finished needles will be produced therefrom as illustrated and presently preferred or the shaping may be performed at the end of a piece of stock for one needle.

Figure 13:
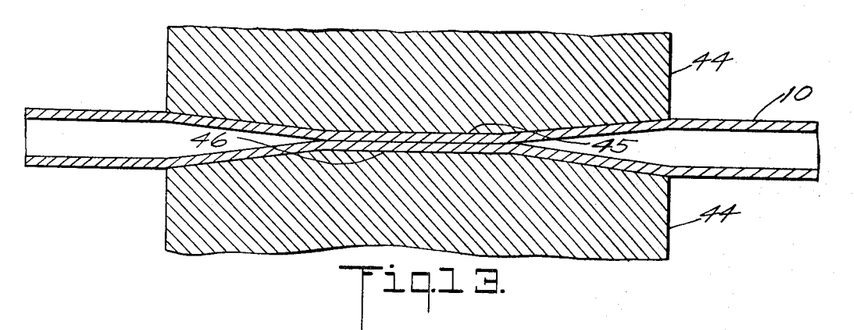
FIG. 13 depicts the dies being used to final shape the tube throughout the area in which the point will subsequently be formed.

The final shaping of the tubing is preferably accomplished to dies 44. These dies may be shaped as shown in FIG. 13.

The flat angular dies 44 should be provided with press means (not shown) so that opposite sides, for convenience of reference "top" 45 and "bottom" 46 sides, of the tubing 10 are pressed into intimate interrelation. While the other pairs of does must also be provided with means for forcing the members of a pair toward each other to collapse the tubing, it has been found best to only just collapse the tubing with their dies, and to then force the sides together wtih substantial pressure by the final flat angular dies. The intimate interrelation of the flattened sides promotes, among other things, a weld over the full area of the point and into just in one spot. Also, this flat area of intimate relationship may, for example, extend along the axis of the hollow member a distance of about 10 to 30 percent of the distance of the finished sloping portion of the needle, after it has been ground to a cutting edge or point.

In particular and according to an alternative further teaching of the invention, the syringe needle tubing may be shaped by the following special method and technique. By this method, the tubing may be continuously formed by being passed through and between oscillating or vibrating long dies. This is in place of a step-by-step progressive forming of the tubing.

Figure 24:
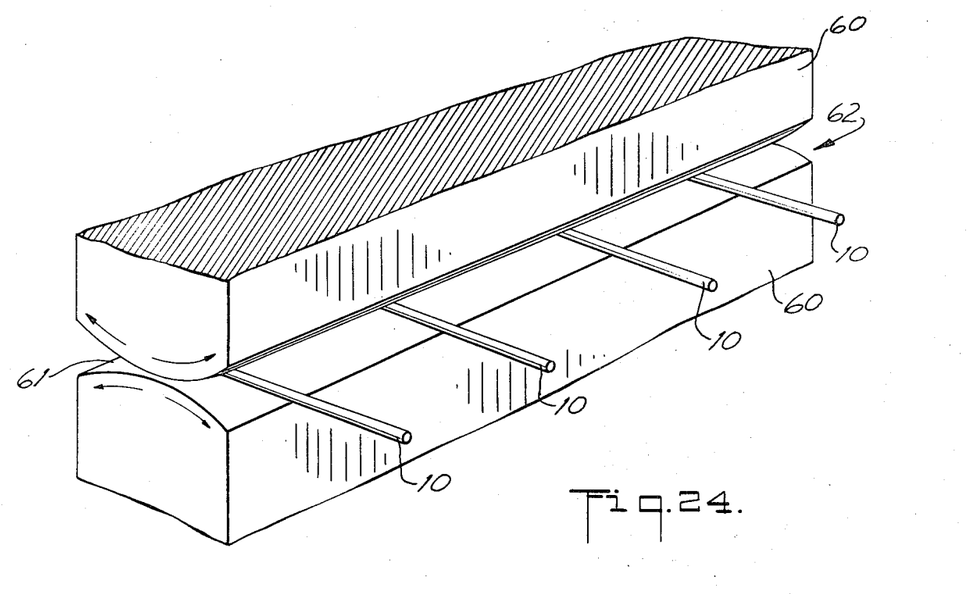
FIG. 24 shows a partial perspective view of a vibrating long die apparatus for forming needle tubing according to the present invention.
Figure 25:
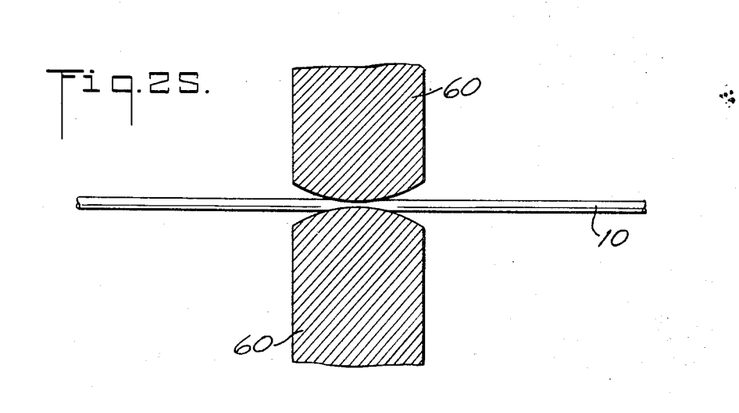
FIG. 25 shows a partial cross-sectional view through the long dies of FIG. 24.

Referring to FIGS. 24 and 25, the two long dies are positioned one above the other. They are spaced apart on one end by an amount sufficient to receive and guide a transversely disposed length of needle tubing for movement through and between them. The working faces of the two dies gradually slope together so that at the rear or exit end they are separated by a distance corresponding tot he thickness of fully collapsed tubing or even by a slightly lesser distance so as to insure that the tubing will be fully collapsed and the opposite tubing wall portions pressed into intimate interrelation contact with each other. It should be understood that for the opposed die faces which are curved across the width of the dies, the spacing distances just mentioned refer to the spacing between the closest portions of the opposite dies at any given location along their lengths.

In one embodiment the opposed working surfaces of the long dies are curved generally as the working surfaces on the successively used hard round dies are curved; the opposed portions of the long dies having the same curvatures. In this embodiment, the dies are oscillated about an axis which may be generally parallel to the working surface on the dies or to the path of the tubing between the dies. It is presently thought desirable for the radius of oscillation or vibration to be equal to or longer than the radius of curvature for the working face. The metal of the tubing walls is flowed from its initial round configuration when inserted at the front opening of the dies to a collapsed configuration when it leaves the dies, much like that achieved by the step-by-step forming discussed above. If the wiping action of the oscillating dies is not sufficient to create a sufficient flat area throughout which the opposite wall portions are in contact, the tubing may be moved slightly back and forth endwise while it is being passed through the dies so as to subject some small length of the tubing to the action of the dies in the area of their least separation. The tubing may be moved through the dies by hand, or by traveling belt or other conventional methods and the dies may be reciprocated or vibrated by electro-mechanical or ultrasonic apparatus as will be apparent to those skilled in these arts in view of this disclosure.

FIG. 24 schematically shows long dies 60, spaced apart at a forward end 61 and gradually sloping together at an exit or rear end 62. Lengths of tubing 10 are shown being passed through and between the dies.

FIG. 25 shows a cross-sectional view of the dies with a partially formed length of tubing 10 therebetween. The mounts and powering apparatus for the dies are not shown.

In another specific embodiment, the long dies are positioned and spaced as described just above but they are adapted for reciprocation to and from each other. In this embodiment the working faces of the dies at the front end desirably are shaped to correspond to the working surfaces on the hard round dies 35 described above. The radius of curvature for the working surfaces gradually is increased to that used for the dies 40 as described above, and thereupon the shaping of the working surfaces continues so that at the rear portion of the long dies the working surfaces have taken on the general configuration of the dies 44 described above. By moving syringe needle tubing through these dies they will experience a continuous progressive shaping from an original round configuration to the configuration indicated in FIG. 14. The position of the long dies according to this embodiment will be readily apparent in view of this discussion and the preceding discussion and drawings.

Figures 14, 15, 18, 19:
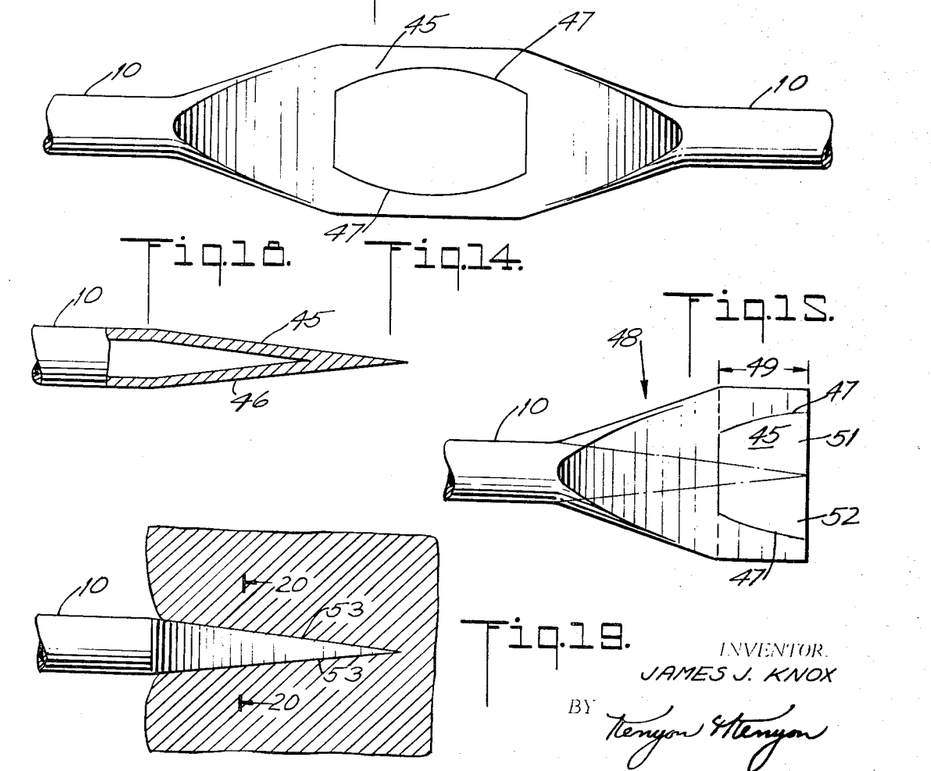
FIG. 14 shows a top view of the tube after being shaped by the dies, the side flair being exaggerated for clarity.
FIG. 15 shows the shaped tube after being cut to a single needle length, and showing the portions marked for grinding.
FIG. 18 shows a vertical longitudinal section through the point.
FIG. 19 is a top partial sectional view depicting the improved needle being inserted in flesh.

According to a preferred practice, the collapsed sides 45, 46 of the hollow member 10 are "spot" welded to each other in the area of their contact, as is schematically shown in one general example as the area within the line 47 in FIGS. 8, 13 and 15. This area may be resistance welded using, for example, a ⅛ inch diameter electrode (class 2 copper) at 100 lbs. pressure and 80 watt seconds of current from a capacitor discharge power supply. Alternatively, the metal may be joined by other welding processes, Tig, Heliarc Spot, Plasma Needle Arc, or resistance welding using an AC timed power supply with up and down slope heat control. In addition, the top and bottom needle surfaces may be adhered by epoxy or resins, such as Sulfone Resin 47 adhesive. It is also considered possible to cold weld these surfaces together either by electric hammer or ultrasonics.

If the invention is practiced to shape two points at once in the center of a double length of tubing as illustrated, the double length is then cut or ground to form two single length needle blanks 48 as shown in FIG. 15.

The single length pieces 48 as shown in FIG. 15 have top 45 and bottom connected by a weld within the area enclosed by line 47. The tip portion 49 is twice the wall thickness of the original tube and twice the thickness of any part of a conventional needle point formed of the same size tubing, since it has been formed by pressing the two walls together and it is accordingly strong enough to serve as a long and sharpenable needle point without requiring addition of extra material.

The next step according to the present invention is to grind or cut the sides of the needle blank to remove material 51 and 52 and leave cutting edges 53 on top and bottom of both sides of the point. If the removal of material 51 and 52 is initially accomplished by cutting, it is desirable to finish the cut by grinding. Each of the cutting edges 53 extends from the point to substantially the full diameter of needle tube. The edges are straight, to give a constant cutting angle of attack as they are moved through the flesh. It should be understood that the edges 53 are produced by grinding on flat planes, an operation which is easy in manufacture and which can be duplicated for sharpening in the field.

Removal of the material 51 and 52 provides opposite openings 23, 24 from the bore. These openings will be contained within the flat planes produced by the side grinding or cutting, and the flat smooth surfaces of these planes surrounding the openings do not cut into the flesh (which is cut and relieved by the side edges 53) but support and guide the flesh so that the heel area 55 is protected.

As a further step, and one which may be omitted but which preferably is not, the top and bottom flattened portions 45 and 46 of the needle are ground so that the cutting edges 53 formed on one side by grinding the sides of the needle point are also ground on their other sides; in other words, both surfaces forming each of the four cutting edges is preferably ground. The surfaces forming each edge are virtually at right angles to each other. As shown in FIGS. 17 and 20, none of the four edges form obtuse angles.

Any grinding and cutting operation produces certain burrs which should be removed if the smoothest surface is desired. This can be accomplished by using a conventional abrasive slurry gas or liquid honing technique wherein small abrasive particles are carried in a rapidly moving gas or liquid stream so that the particles are blown through the openings thereby removing any burrs that might remain.

The needle may be adapted for and attached to a syringe by any conventional method; it is the point and the method of making the point that are the subjects of the present invention.

By the above method a syringe needle point can be manufactured simply and economically on a large scale.

The needle disclosed above by text and drawing, and which can be produced by the above methods or by any other method, such as for example by molding, casting, or by other fabrication, possesses distinct advantages over the needles taught by the prior art. Advantages are realized with small standard needles and for example those that may be made from tubing having a .050 inch OD with a .0085 inch wall thickness, and the advantages increase with the size of the needle.

First, coring is reduced to the point of being eliminated since the openings are contained completely within the planes of the cutting edges, which cutting edges extend all the way back to the body of the tube so as to cut a clean passageway for the needle virtually to its full diameter and cross-sectional area. The angle of attack is small, the initial cuts are started by the solid portion of the needle tip and the openings to the bore of the tube are relatively narrow in consequence of the original shaping operation. As the point is inserted, flesh will be stretched over the edges and cut, and the flesh will be guided and moved away and over the body of the tube by the flat surfaces surrounding the openings rather than being pushed into the openings.

Secondly, being that the point is comprised of four sharp edges, there will be no tearing. Rather, the flesh will be cut cleanly promoting easy entry and quick healing. The cuts are short and straight as illustrated by lines 59 in FIG. 23 in marked contrast to the single long curved core cutting operation of the conventional needle point as illustrated in FIG. 22. The needle taught herein produces less tissue damage and more easily healed cuts than the conventional needle, which is particularly important for multiple injections as, for example, needed by diabetics or persons fed intravenously.

Thirdly, the tip lies on the center line of the tube so that when the needle is inserted it will follow the point straight in, without veering or deflection, even in the case of long, thin, flexible needles.

Fourthly, there are two openings on opposite sides of the point. This allows even dispersion of medication in the desired area.

Further, the openings extend for a major length of the point on opposite sides so as to provide two areas for the passage of fluid into the patient, either of which can be blocked without preventing the passage of fluid into or out of the needle.

I claim:

1. Method of manufacturing a hypodermic needle point from an elongated hollow tubular member made of a hard corrosion resistant material that includes the steps of:
   (a) deforming top and bottom wall portions by gradually and progressively pressing generally inwardly against said top and bottom wall portions with die means so as to gradually and progressively cause the top and bottom wall portions to gradually slope together and intimately contact each other in the area where they have been sloped to be closest together; and
   (b) removing some of the side wall portions of the tubular member which extend between said sloped top and bottom wall portions, to create side surfaces which slope together from the unsloped portion of the tubular member until they intersect in a cutting point or edge in the area where said top and bottom wall portions are in intimate contact, and to provide communication between the interior hollow bore of said tubular member and the exterior, at the sloped side walls thereof.

2. Method as recited in claim 1, wherein said die means extend transversely across said tubular member.

3. Method as recited in claim 2, wherein said dies extend substantially straight in a transverse direction across said tubular member.

4. Method of manufacturing a hypodermic needle point from an elongated hollow tubular member made of a hard corrosion resistant material that includes the steps of:
   (a) deforming top and bottom wall portions by gradually and progressively pressing generally inwardly against said opposite wall portions of said tubular member with die means having a generally rounded outer working surface so as to gradually and progressively cause the top and bottom wall portions to slope substantially together;
   (b) further deforming said top and bottom wall portions by pressing with die means against said sloped wall portions to cause said wall portions to intimately contact each other in the area where they have been sloped to be closest together; and
   (c) removing some of the side wall portions of the tubular member which extend between said sloped top and bottom wall portions, to create side surfaces which slope together from the unsloped portion of the tubular member until they intersect in a cutting point or edge in the area where said top and bottom wall portions are in intimate contact, and to provide communication between the interior hollow bore of said tubular member and the exterior, at the sloped side walls thereof.

5. Method as recited in claim 4, which in addition comprises the step of:
   (a) securing said top and bottom wall portions together in at least a portion of the area where they are in intimate contact.

6. Method as recited in claim 4, wherein the die means employed in each of said deforming steps extend transversely across said tubular member.

7. Method as recited in claim 4, in which the removing step includes:
   (a) grinding said side wall portions to create side surfaces which slope together and meet in a cutting edge or point, each of two said side surfaces having an opening extending into the hollow bore of said tubular member.

8. Method as recited in claim 2, which in addition comprises the step of:
   (a) grinding the exterior surfaces of the sloping top and bottom wall portions and grinding the side wall portions to form side surfaces at substantially right angles to the ground surfaces of the top and bottom wall portions thereby creating four cutting edges, each of said edges being formed of ground surfaces meeting at substantially right angles and each of said edges sloping from a cutting point backwardly and outwardly toward the unsloped portion of said tubular member.

9. Method as recited in claim 4, which in addition comprises the step of:
   (a) grinding the exterior surfaces of the sloping top and bottom wall portions and grinding the side wall portions to form side surfaces at substantially right angles to the ground surfaces of the top and bottom wall portions thereby creating four cutting edges, each of said edges being formed of ground surfaces meeting at substantially right angles and each of said edges sloping from a cutting point backwardly and outwardly toward the unsloped portion of said tubular member.

10. Method as recited in claim 5, in which the removing step includes:
    (a) grinding said side wall portions to create side surfaces which slope together and meet in a cutting edge or point.

11. Method as recited in claim 5, which in addition comprises the step of:
    (a) grinding the exterior surfaces of the sloping top and bottom wall portions and grinding the side wall portions to form side surfaces at substantially right angles to the ground surfaces of the top and bottom wall portions thereby creating four cutting edges, each of said edges being formed of ground surfaces meeting at substantially right angles and each of said edges sloping from a cutting point backwardly and outwardly toward the unsloped portion of said tubular member.

12. Method as recited in claim 5, in which the step of securing said top and bottom wall portions together comprises:
(a) firmly pressing said top and bottom wall portions together at the location where they have been sloped to be closest together so as to cause them to lie in intimate relationship throughout a consequently flat area; and
(b) welding said top and bottom wall portions together within an area where they are in intimate relation.

13. Method as recited in claim 4, in which said top and bottom portions are deformed by progressive flowing of the material of said portions gradually into desired locations.

14. Method as recited in claim 4, in which the initial step of deforming the tubular member is carried out by sequentially using a series of dies having generally convex-shaped working surfaces, beginning with a relatively small die, and thereafter using progressively larger dies.

15. Method as recited in claim 14, in which said top and bottom wall portions are substantially sloped by initially using a relatively small die and thereafter using progressively larger dies to increase the radius of slope until the final deforming step is carried out with a die having substantially flat working surfaces so that the slopes assumed by said wall portions are substantially straight.

16. Method as recited in claim 13, in which said wall portions are formed by vibrating dies.

17. Method as recited in claim 4, in which said needle point is formed at a location substantially inward from both ends of a tubular member so that the deforming steps will simultaneously provide two needle points.

18. Method as recited in claim 17, which in addition comprises the step of:
(a) subsequent to the deforming steps wherein the top and bottom wall portions are sloped generally together, cutting said tubular member transversely into two virtually identical portions and subsequently grinding two separate needle points.

19. Method as recited in claim 7, which in addition comprises the step of:
(a) removing burrs by directing abrasive particles through the openings which are formed to provide communication between the interior hollow bore of said tubular member and the exterior thereof.

20. Method as recited in claim 16, in which the wall portions are formed by continuously subjecting said wall portions between opposite disposed oscillating and vibrating dies which incline gradually toward one another so that passing the tubular member transversely from one end of said dies to the other end will form the progressive shape of said wall portions.

References Cited

UNITED STATES PATENTS

| | | | |
|---|---|---|---|
| 2,634,726 | 4/1953 | Hanson | 128—221 |
| 2,697,438 | 12/1954 | Hickey | 128—221 |
| 2,717,600 | 9/1955 | Huber | 128—221 |
| 2,989,053 | 6/1961 | Hamilton | 128—221 |
| 3,090,384 | 5/1963 | Baldwin et al. | 128—221 |
| 3,119,391 | 1/1964 | Harrison | 128—221 |
| 3,173,200 | 3/1965 | Dunmire et al. | 29—414 |
| 3,181,336 | 5/1965 | Schofield | 72—367 X |
| 3,408,846 | 11/1968 | Schofield | 163—5 X |

JOHN F. CAMPBELL, Primary Examiner

D. C. REILEY, Assistant Examiner

U.S. Cl. X.R.

72—367; 128—221; 163—5